United States Patent
Takeuchi

(10) Patent No.: US 7,463,815 B2
(45) Date of Patent: Dec. 9, 2008

(54) RECORDING APPARATUS

(75) Inventor: Kengo Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 10/546,755

(22) PCT Filed: Feb. 19, 2004

(86) PCT No.: PCT/JP2004/001936

§ 371 (c)(1),
(2), (4) Date: Aug. 25, 2005

(87) PCT Pub. No.: WO2004/077824

PCT Pub. Date: Sep. 10, 2004

(65) Prior Publication Data

US 2006/0215983 A1    Sep. 28, 2006

(30) Foreign Application Priority Data

Feb. 27, 2003    (JP) .............................. 2003-051303

(51) Int. Cl.
*H04N 5/91* (2006.01)
*G11B 3/64* (2006.01)

(52) U.S. Cl. .......................................... 386/46; 369/84
(58) Field of Classification Search .................. 386/46; 369/84

See application file for complete search history.

(56) References Cited

U.S. PATENT DOCUMENTS

| 5,974,018 | A | * | 10/1999 | Takenaka | 369/84 |
| 6,442,327 | B1 | * | 8/2002 | Yamada et al. | 386/46 |
| 6,560,174 | B1 | * | 5/2003 | Takenaka | 369/47.12 |

FOREIGN PATENT DOCUMENTS

| JP | 10-134546 | 5/1998 |
| JP | 11-86516 | 3/1999 |
| JP | 11-353802 | 12/1999 |
| JP | 2000-30413 | 1/2000 |
| JP | 2001-136475 | 5/2001 |
| JP | 2002-74839 | 3/2002 |
| JP | 2002-298501 | 10/2002 |
| JP | 2002-359794 | 12/2002 |
| JP | 2003-9049 | 1/2003 |

* cited by examiner

*Primary Examiner*—Thai Tran
*Assistant Examiner*—Asher Khan
(74) *Attorney, Agent, or Firm*—Fitzpatrick, Cella, Harper & Scinto

(57) ABSTRACT

In a recording apparatus that is capable of recording information on a plurality of recording media, i.e., first and second memory cards, the information is recorded on the first and second memory cards simultaneously, the information that has been recorded only on one of the memory cards is left and the information recorded on the other is deleted in dependence upon the available capacities of the memory cards at the end of recording. Performing recording in this manner makes it possible to store continuous data collectively on a single recording medium to the greatest extent possible.

4 Claims, 6 Drawing Sheets

RECORDING APPARATUS

TECHNICAL FIELD

This invention relates to a technique for recording information and, more particularly, to a recording technique capable of recording information on a plurality of recording media.

BACKGROUND ART

Recording media for a moving-picture recording apparatus are mainly of the cassette type at the present time but optical disk media also have appeared. A moving-picture image sensing apparatus capable of utilizing an IC memory card for recording when still pictures are taken also has become generally available.

Digital cameras originally possessed only a still-picture recording function and many of these cameras use an IC memory card as the recording medium. In recent years, however, many of these cameras also have a moving-picture recording function and the recording of moving pictures on these IC memory cards is now common practice.

An increase in the recording capacity of IC memory cards and improvements in moving-picture compression techniques can be mentioned as reasons why moving pictures are now being recorded on IC memory cards. Nevertheless, the recording capacity of IC memory cards in general use at the present time is still inadequate for recording moving pictures. However, since IC memory cards generally are compact, it is conceivable that there will appear a moving-picture recording apparatus that attempts to furnish storage capacity for recording of moving pictures by utilizing a plurality of IC memory cards.

In such a moving-picture recording apparatus, which is equipped with a plurality of interfaces for recording media such as IC memory cards, assume that a plurality of recording media (e.g., two media referred to as IC memory card 1 and IC memory card 2) have been inserted and that IC memory card 1 runs out of available recording capacity while recording of a moving picture on IC memory card 1 is in progress. Processing conceivable in such case is to treat the moving picture up to this point in time as one moving-picture file, close the file and terminate recording or, alternatively, continue recording the scene on the other card, namely IC memory card 2.

In the alternative case, however, moving-picture information or data that is intended originally to be a single continuous shot (a single cut) is recorded spanning a plurality of recording media. As a result, managing the recording media is complicated and there is also a problem is terms of convenience when the recorded moving-picture information is utilized. Accordingly, it is preferred that a moving picture of a single shot be recorded so as to fit on a single recording medium to the greatest extent possible.

DISCLOSURE OF INVENTION

Accordingly, an object of the present invention is to provide a recording apparatus capable of accommodating a plurality of inserted recording media, in which continuous information can be recorded so as to fit on a single recording medium to the greatest extent possible.

According to an aspect of the present invention, a recording apparatus comprising input means for inputting informational data first interface means for recording the informational data on and playing it back from a first recording medium second interface means for recording the informational data on and playing it back from a second first recording medium; an control means for controlling the first and second interface means so as to record the informational data on at least one of the first and second recording media in accordance with a record-start command, and, if quantity of recorded information of the informational data starting from the record-start command has exceeded a first information quantity that corresponds to remaining recording capacity of the first recording medium prevailing at the start of recording, record the informational data of the first information quantity recorded on at least one of the first and second recording media from the start of recording, as well as informational data input in excess of the first information quantity, on the second recording medium.

According to another aspect of the present invention, a recording apparatus for writing and reading informational data having continuity to and from first and second recording media, the apparatus being adapted so as to start the writing of the informational data to both the first and second recording media in response to a write-start command, halt the writing of the informational data in response to a write-end command and delete the written informational data from the first or second recording medium based upon available capacities of the first and second recording media when the writing of informational data ends.

According to a further aspect of the present invention, a recording apparatus for writing and reading informational data having continuity to and from first and second recording media, the apparatus being adapted so as to start the writing of the informational data to the first recording medium in response to a write-start command, write ensuing informational data to the second recording medium if the first recording medium has run out of available capacity, halt the writing of informational data in response to a write-end command and move the informational data that has been recorded on the first recording medium to the second recording medium.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will now be described in detail in accordance with the accompanying drawings. In the embodiments that follow, a moving-picture recording apparatus is described as one example of a recording apparatus according to the present invention. However, what can be recorded by the recording apparatus of the present invention is not limited to moving-picture information. Various types of information may stored, such as still-picture information and program files.

First Embodiment

A recording apparatus according to this embodiment is a recording apparatus for recording information that has continuity, the apparatus including a first recording medium, a second recording medium, recording/playback means capable of reading and writing the first and second recording media, and control means for controlling the recording/playback means. The control means controls the recording/playback means so as to start the writing of information to both the first and second recording media in response to a write-start command, terminate the writing of information in response to a write-end command, and, on the basis of available capacity of the first and second recording media at termination of writing, delete written information from either the first or second recording medium.

Figure 1:
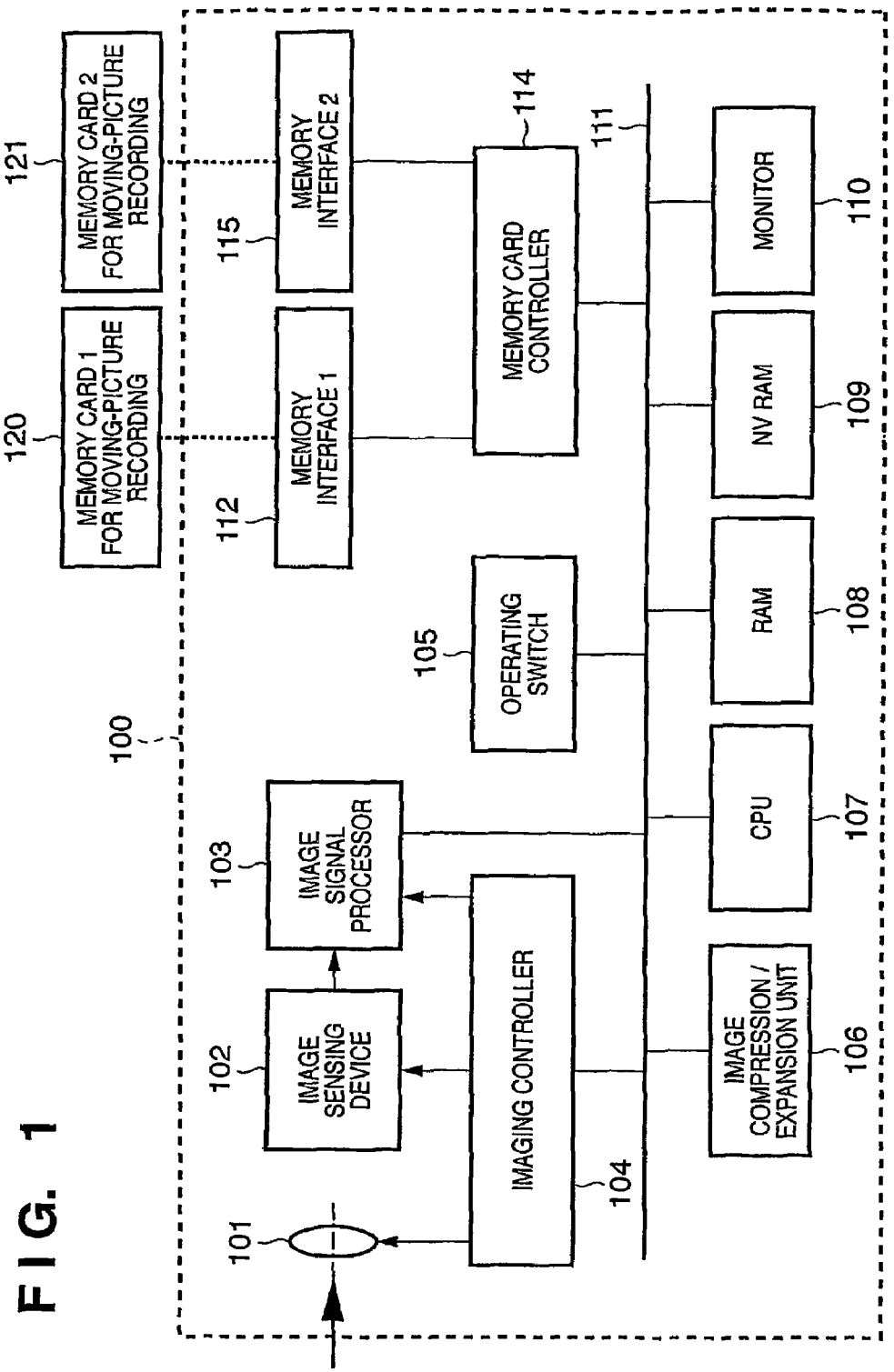
FIG. 1 is a block diagram illustrating an example of the structure of a moving-picture image sensing apparatus according to an embodiment of the present invention.

FIG. 1 is a block diagram illustrating an example of the structure of a moving-picture image sensing apparatus 100 serving as a first embodiment of the present invention. The components of the moving-picture image sensing apparatus 100 are connected by a bus 111 and operate in accordance with control exercised by a CPU 107. In this embodiment, the moving-picture image sensing apparatus 100 has two memory interfaces 112 and 115 and therefore is capable of utilizing two IC memory cards 120 and 121 as recording media for recording moving pictures.

Operation of the moving-picture image sensing apparatus 100 at the time of recording will now be described. If the moving-picture image sensing apparatus 100 is started up in the recording mode, a program that has been stored in a non-volatile RAM (NVRAM) 109 is loaded into part of a RAM 108. The CPU 107 executes the program that has been loaded in the RAM 108 and controls the components of the apparatus. Recording control processing in each of the embodiments described below also is implemented by having the CPU 107 execute a program that has been loaded in the RAM 108 and control the components of the apparatus.

A lens unit 101, an image sensing device 102 and an image signal processor 103 are controlled by an imaging controller 104, which is controlled by the CPU 107, whereby an image sensing operation is performed in a manner described later. A video image that has been formed on the image sensing device 102 is opto-electronically converted and then is read out at a predetermined period. The image signal processor 103 applies well-known image processing to the moving-picture signal that is output from the image sensing device 102 and generates a moving-picture signal in a digital format.

When an operation for specifying the recording of an image is performed by an operating switch 105, the digital moving-picture signal that has been produced by the image signal processor 103 is applied to an image compression/expansion unit 106. The latter subjects the moving-picture signal to compressive encoding in a prescribed format such as MPEG to convert the moving-picture signal to a compressed moving-picture signal and then stores the compressed moving-picture signal in the RAM 108 temporarily. The compressed moving-picture signal is recorded on the IC memory card 1 (120) or IC memory card 2 (121), which is managed by a memory card controller 114, via the memory interface 1 (112) or memory interface 2 (115).

A method of recording a moving picture in the moving-picture image sensing apparatus of this embodiment will be described with reference to FIG. 2.

As mentioned above, the moving-picture image sensing apparatus 100 of this embodiment is capable of utilizing the two IC memory cards 120, 121. FIG. 2 is a diagram schematically illustrating the image recording operation in a case where these two IC memory cards have been inserted.

Figure 2:
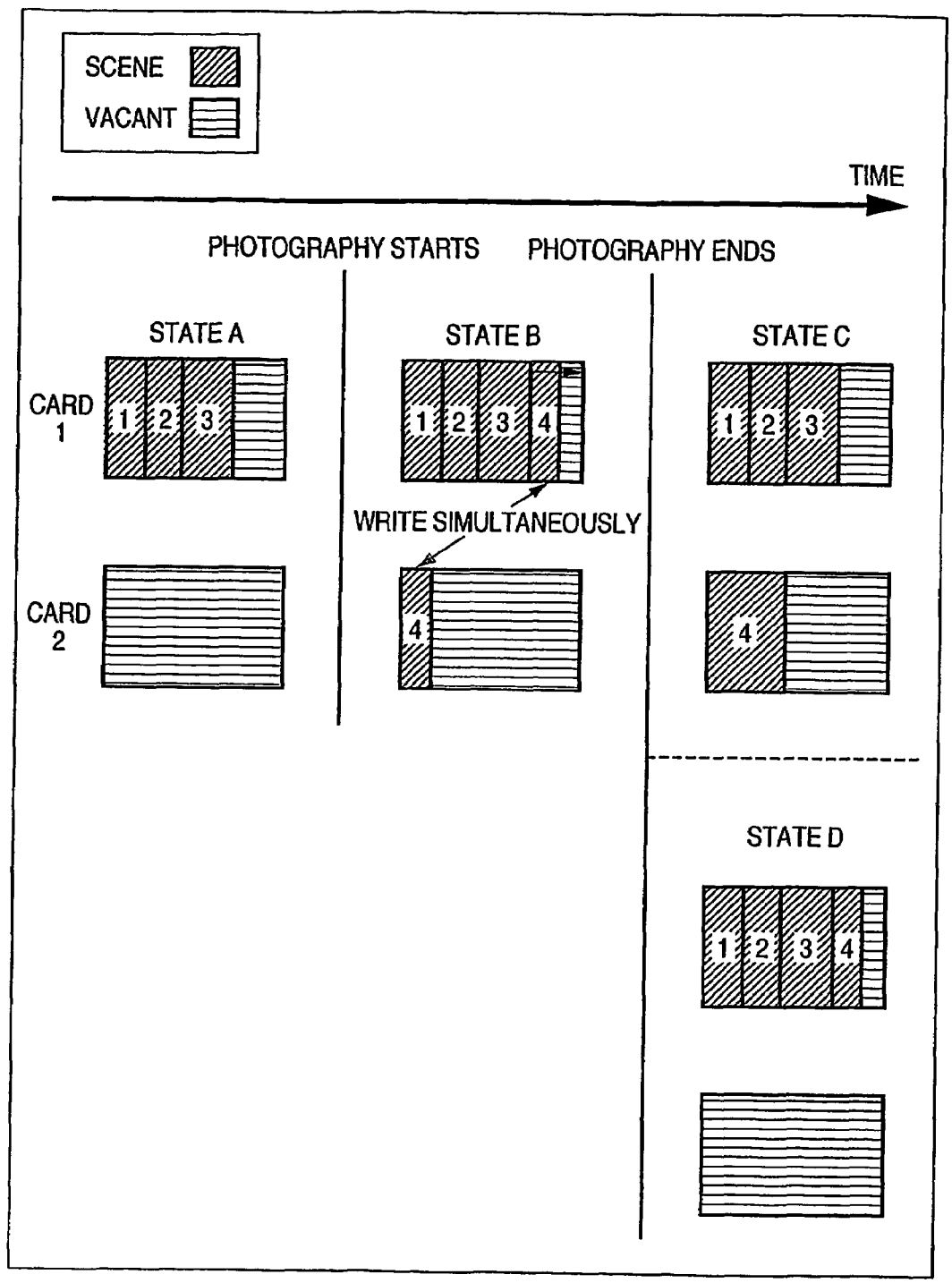
FIG. 2 is a diagram schematically illustrating recording control processing according to a first embodiment.

FIG. 2 illustrates the state of use of the IC memory cards. The IC memory card 1 (120) connected to the interface 1 (112) is the upper card in FIG. 2, and the IC memory card 2 (121) connected to the interface 2 (115) is the lower card in FIG. 2. The state of the cards changes along the time axis, i.e., from state A, which is that prior to photography, to state B, which is that during photography, and to either state C or state D, which is after photography has ended.

Assume that data and scenes 1 to 3 from previous photography have already been recorded on the IC memory card 1 in state A, which is prior to the start of photography. Further, assume that no scenes have been recorded on IC memory card 2 and that the entire card is therefore blank. When photography is started and the recording of a new scene 4 begins, recording on both IC memory card 1 and IC memory card 2 is performed simultaneously (state B) in this embodiment.

If, at the end of photography, the photography has exceeded the available capacity of IC memory card 1, the data that has been recorded on IC memory card 2 is left on IC memory card 2 and the data that has been recorded on IC memory card 1 is erased from this card (state C). Further, if photography ends within the available capacity of IC memory card 1, the data that has been recorded on IC memory card 2 is erased and the data that has been recorded on IC memory card 1 is left on this card (state D). By virtue of this operation, a series of moving-picture signals constituting a shot scene is recorded and preserved as a single file on either IC memory card 1 or IC memory card 2.

Recording control processing for implementing such a recording method will be described with reference to the flowchart of FIG. 5.

When the power supply of the apparatus is turned on, information relating to the IC memory cards is collected (step S502) following prescribed initialization processing (or as part of the initialization processing). This information includes the number of IC memory cards that have been inserted, the available capacity of each IC memory card and recording area information (range of addresses, etc.). Here it is assumed that two IC memory cards have been inserted and a main IC memory card (IC memory card 1 in the example of FIG. 2) to be used in recording a moving picture next and an auxiliary IC memory card (IC memory card 2 in the example of FIG. 2) to be recorded on supplementarily are selected from these two IC memory cards. In this embodiment, the IC memory card having the larger available capacity is selected as the auxiliary IC memory card and the other IC memory card is selected as the main IC memory card.

Next, at step S503, it is determined whether the main IC memory card has sufficient available capacity. This can be achieved by determining whether the following relation holds, by way of example:

[(average capacity needed to record a moving picture of a prescribed length)+(prescribed capacity)]≦(available capacity).

In the case of a consumer-oriented recording apparatus as in this embodiment, one scene (photography from a command to start recording to a command to halt recording) generally lasts tens of seconds to several minutes. In this embodiment, it is assumed that whether the necessary capacity remains is determined in a case where a scene of, e.g., one minute has been recorded at set recording data rate.

If it has been determined that there is enough available capacity ("YES" at step S503), a transition is made to a normal recording mode in which recording is performed only on the main IC memory card (S509). The apparatus then waits for a photography-start command at S506.

If a "NO" decision is rendered at step S503, then it is determined at step S504 whether the auxiliary IC memory card has sufficient available capacity. This determination can be made based upon the same condition as that of S503. If it is determined at S504 that the auxiliary IC memory card does not have sufficient available capacity, then the user is alerted, as by display of a message or by voice, of the fact that there is little memory-card capacity left (S508). Then, upon making the transition to the normal recording mode for recording solely upon the main IC memory card at step S509, the apparatus waits for photography to start (S506).

It should be noted that the determination processing at steps S503 and S504 is unnecessary in a case where simultaneous recording is always carried out. However, when simultaneously recording is carried out at all times, more power is consumed as compared with normal recording. If the apparatus is an image recording apparatus that operates on a battery, as in the case of a digital camera, the length of time the apparatus can be operated will decline. In this embodiment, therefore, a shift is made to the normal recording mode by the above-described determination in a case where the necessity and effectiveness of simultaneous recording are considered small.

If it is determined at step S504 that the available capacity of the auxiliary memory card is sufficient, a transition is made to a simultaneous recording mode (S505), in which data is written to both the main IC memory card and auxiliary IC memory card simultaneously in the manner described in connection with FIG. 2. The apparatus then waits for photography to start (S506).

If start of photography is commanded by pressing the operating switch 105 at S506, control proceeds to S507. The user may be notified of which IC memory card is being written to during recording as by displaying a message on a monitor 110 or lighting an LED that is provided for each memory interface. In this case the user can be notified of the fact that recording has started in the simultaneous recording mode and of the fact that the main IC memory card has run out of available capacity during recording in the simultaneous recording mode.

If end of photography is commanded at S510, it is determined whether recording was being performed in the simultaneous recording mode (S514). If the mode is the normal recording mode ("NO" at S514), record processing is exited. If the mode is the simultaneous recording mode, then it is determined at S511 whether the main IC memory card (IC memory card 1 in FIG. 2) has any remaining capacity. If the IC memory card 1 has remaining capacity, then the moving-picture data (scene 4) that was simultaneously recorded on the auxiliary IC memory card (IC memory card 2 in FIG. 2) is erased at S512. If it is found at S511 that the IC memory card 1 has no remaining capacity, then the moving-picture data (scene 4) that was simultaneously recorded on the main IC memory card is erased at S513 and processing is exited.

Figure 5:
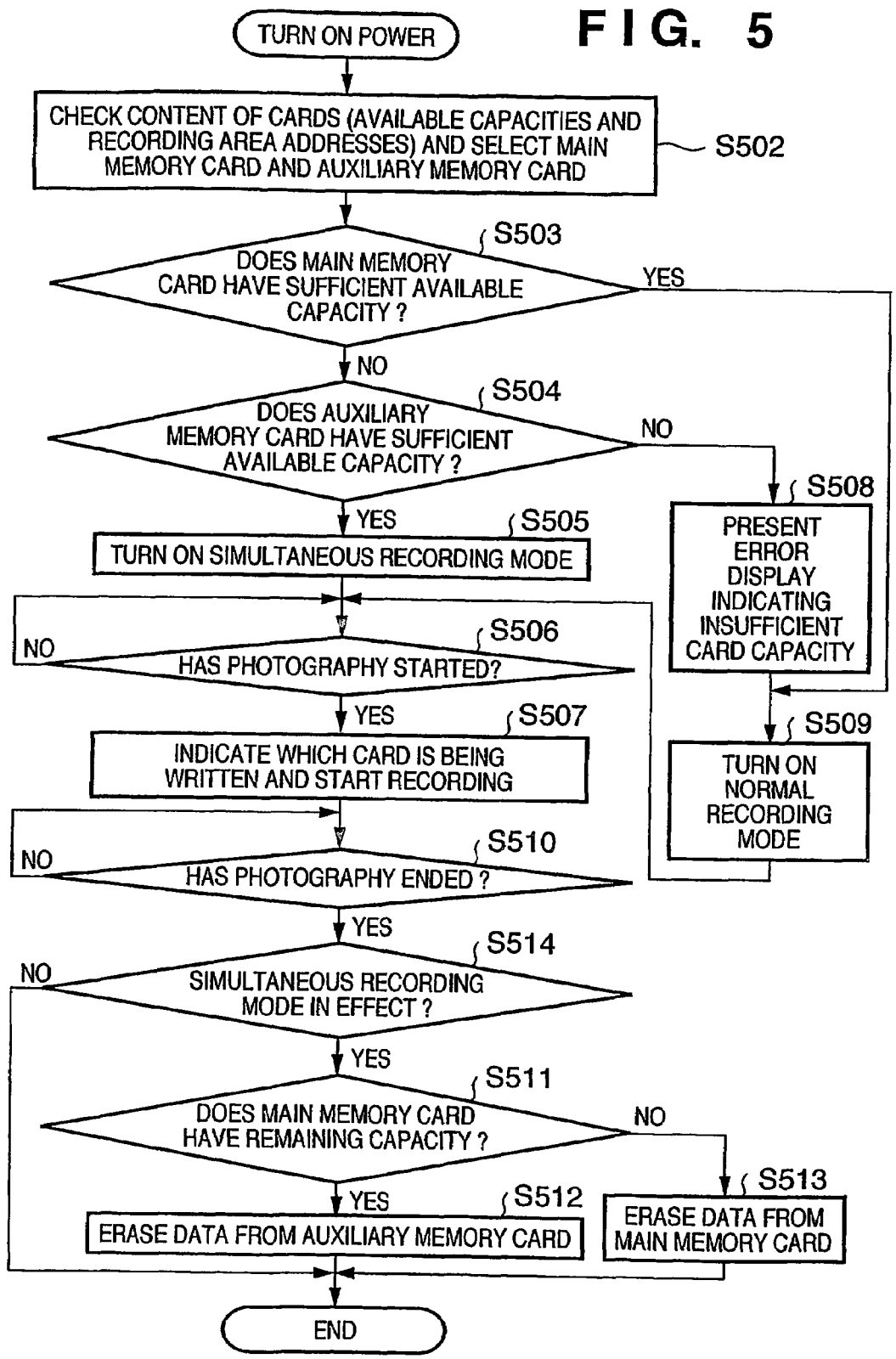
FIG. 5 is a flowchart for describing recording control processing according to the first embodiment.

In the flowchart of FIG. 5, the remaining capacity of the main IC memory card is detected after photography ends. However, by way of example, it may be so adapted that the remaining capacity is monitored while recording is being performed on the main memory card, erasing the moving-picture signal that has been recorded on the main memory card at the moment the memory card runs out of remaining capacity prior to a command to end photography, and continuing the recording of the moving-picture signal only on the auxiliary memory card.

Thus, in accordance with this embodiment, as described above, a moving-picture signal is recorded simultaneously on two IC memory cards. As a result, even if one of the IC memory cards does not have any available recording capacity at the end of recording, a moving-picture signal that has been recorded on the other IC memory card is left on this card, thereby making it possible to record one scene (one shot) of a moving picture on one IC memory card.

Second Embodiment

A second embodiment of the present invention will be described next. A recording apparatus according to this embodiment is a recording apparatus for recording information that has continuity, the apparatus including a first recording medium, a second recording medium, recording/playback means capable of reading and writing the first and second recording media, and control means for controlling the recording/playback means. The control means controls the recording/playback means so as to start the writing of information to the first recording medium in response to a write-start command, write successive information to the second recording medium if there is no longer available capacity in the first recording medium, terminate the writing of information in response to a write-end command and move information, the writing of which to the first recording medium has been completed, to the second recording medium.

The first embodiment performs recording simultaneously on two IC memory cards and, depending upon whether the main IC memory card has available capacity at the end of photography, deletes the moving picture-signal that has been recorded on one of the IC memory cards. By contrast, this embodiment starts the recording of a moving picture in the normal recording mode, changes over the IC memory card recorded on at the moment available capacity runs out during recording and consolidates information on a single IC memory card after photography ends, thereby obtaining results similar to those of the first embodiment.

It should be noted that this embodiment also is capable of utilizing unchanged the structure of the moving-picture image sensing apparatus 100 described in the first embodiment and, hence, a description of this structure is omitted. The description of this embodiment will focus only on recording control that differs from the control of the first embodiment.

Figure 3:
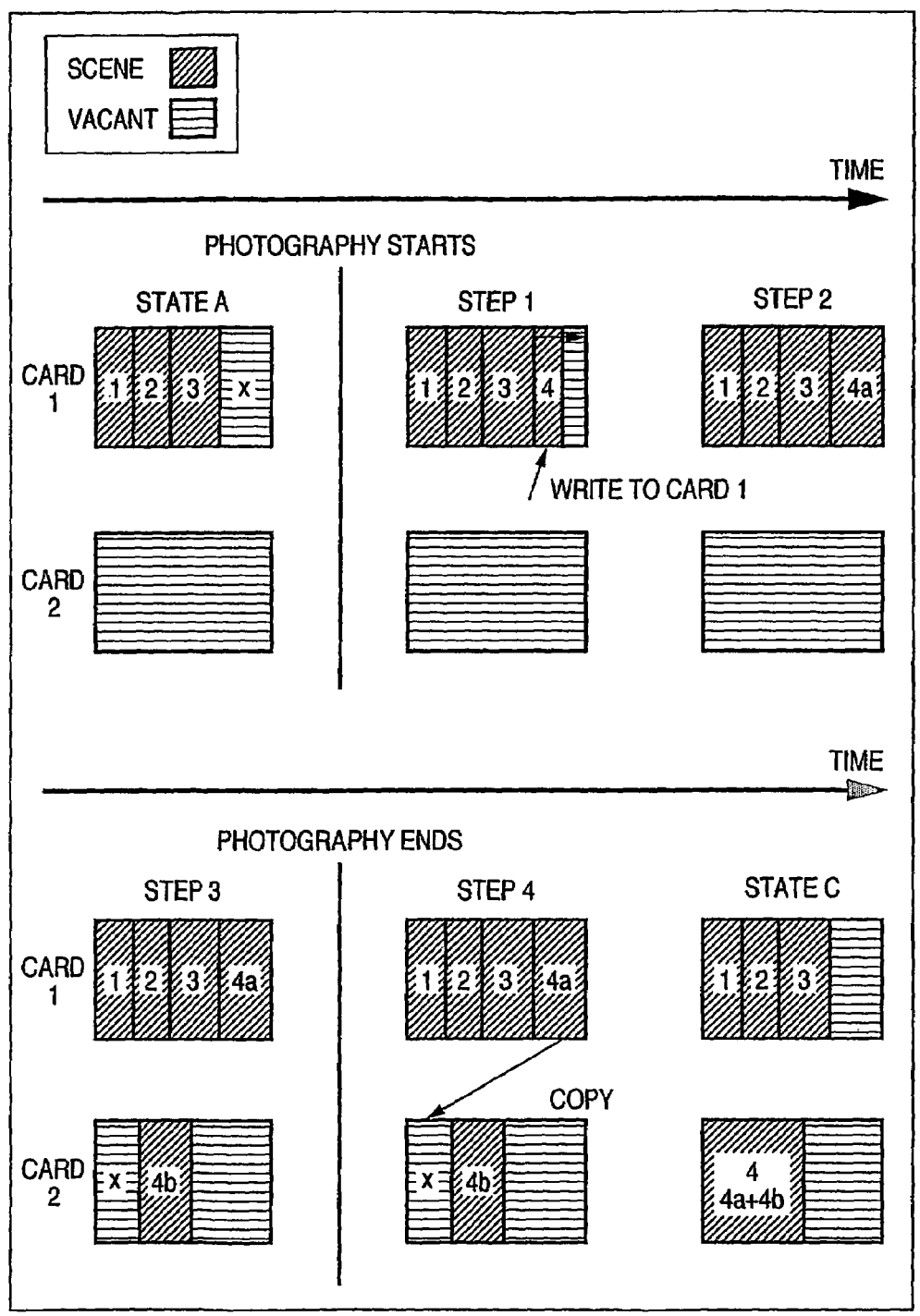
FIG. 3 is a diagram schematically illustrating recording control processing according to a second embodiment.

FIG. 3 is a diagram schematically illustrating recording control in this embodiment and corresponds to FIG. 2 of the first embodiment.

When photography is started in state A, which is that prevailing prior to photography, as in the first embodiment, recording (of scene 4) begins on IC memory card 1 in the manner indicated at step 1 in FIG. 3. It should be noted that (x) represents the available capacity of IC memory card 1 in state A in this embodiment.

The recording of scene 4 is performed while the available capacity of IC memory card 1 is checked. If the IC memory card 1 runs out of available capacity before the end of photography is triggered (step 2), recording starts on IC memory card 2 at step 3 after an area that corresponds to capacity (x) in IC memory card 1 is reserved in IC memory card 2 starting from the beginning of its vacant area. Of course, the area reserved in IC memory card 2 may just as well start from the tail end of the vacant area or may be any area. However, if the area is reserved from the tail end, then, in calculations performed when alerting the user to the remaining capacity, it will be necessary to change the address used as the upper limit in accordance with the capacity reserved as the vacant area.

If a trigger to end photography is entered, the first half (4a) of scene 4 that was recorded on IC memory card 1 is copied at step 4 to the vacant area reserved on IC memory card 2. As a result, the moving-picture signal of scene 4, which is the result of connecting the first half (4a) of scene 4 and the second half (4b) that has been recorded on IC memory card 2, is stored in its entirety as a single file on IC memory card 2.

Scene 4 (4a) is then deleted from IC memory card 1, which ran out of available capacity during recording, in a manner similar to that of the first embodiment (state C).

Figure 6:
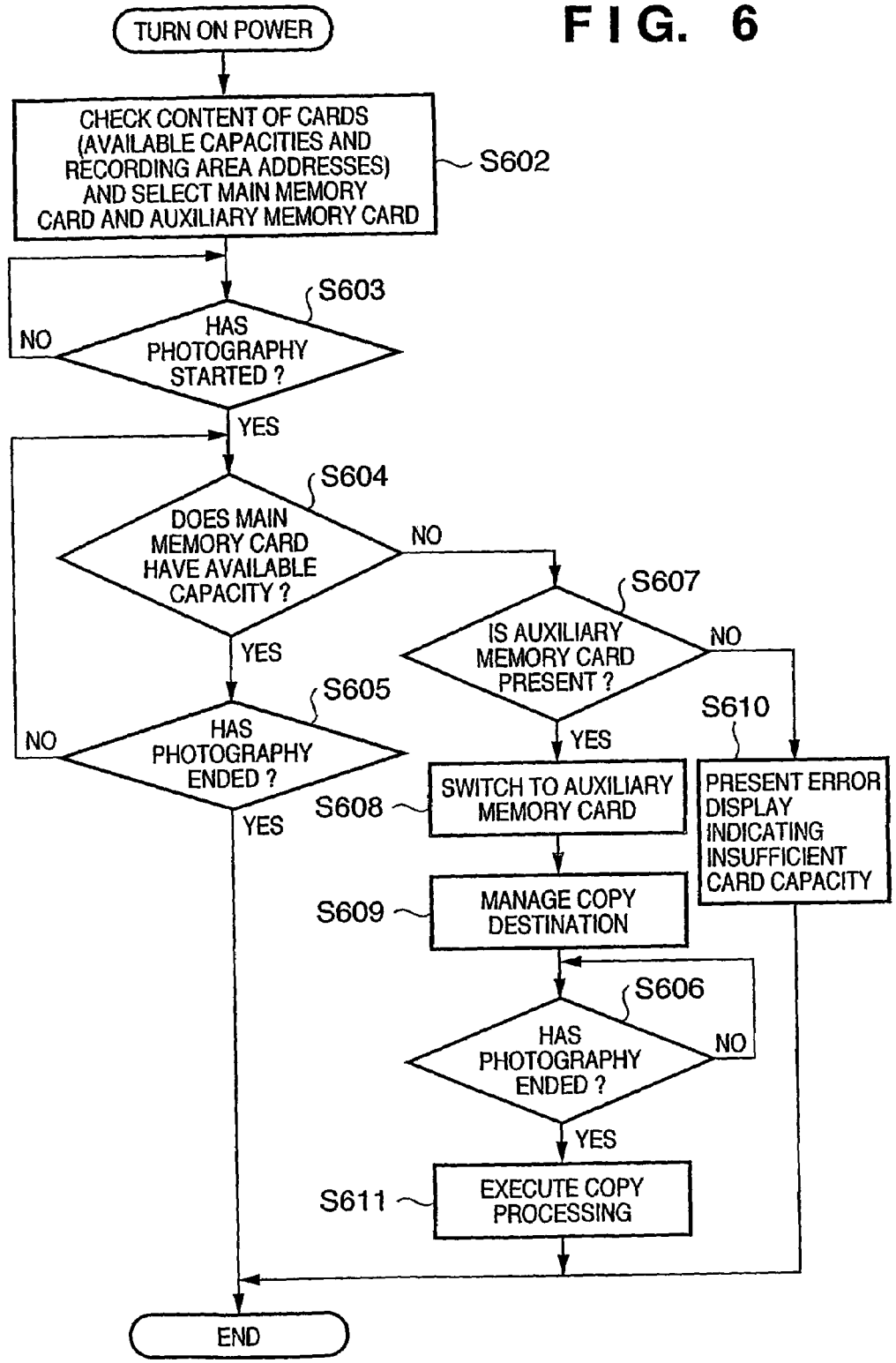
FIG. 6 is a flowchart for describing recording control processing according to the second embodiment.

Recording control processing for implementing such a recording method will be described with reference to the flowchart of FIG. 6.

When the power supply of the apparatus is turned on, information relating to the IC memory cards is collected (step S602) following prescribed initialization processing (or as part of the initialization processing). This information includes the number of IC memory cards that have been inserted, the available capacity of each IC memory card and recording area information (range of addresses, etc.). Here it is assumed that two IC memory cards have been inserted.

When an IC memory card is switched over during recording, the acquired information concerning the available capacity of each IC memory card is used in calculating an address for reserving available capacity on the switched IC memory card and for starting recording on this card.

A main IC memory card (IC memory card 1 in the example of FIG. 3) to be used in recording a moving picture next and an auxiliary IC memory card (IC memory card 2 in the example of FIG. 3) to be recorded on supplementarily are selected from these two IC memory cards. In this embodiment, the IC memory card having the larger available capacity is selected as the auxiliary IC memory card and the other IC memory card is selected as the main IC memory card.

Control then proceeds to S603, at which the apparatus waits for a photography-start command. If photography starts here, control proceeds to the loop of S604 and S605, where recording is continued while the available capacity of the main IC memory card (IC memory card 1) for recording and a photography-end command are monitored.

If it is sensed at S604 that the main IC memory card has run out of available capacity before the photography-end command is sensed at S605, control proceeds to S607 to check whether the auxiliary IC memory card is present. If the auxiliary IC memory card is absent, control proceeds to S610, at which the user is notified as by display of an error message of the fact that there is inadequate memory capacity. Processing is then exited. If the auxiliary IC memory card is present, on the other hand, control proceeds to S608, where the destination for recording is changed over to the auxiliary IC memory card. Recording on the auxiliary IC memory card is then started. At this time, as described above, the address at which writing to the auxiliary IC memory card starts (or the upper-limit address for writing) is decided using the available capacity of the main IC memory card acquired at S602.

It should be noted that S604 does not necessarily mean detecting that there is absolutely no available capacity left. For example, it is permissible to adopt an arrangement in which the time, etc., needed to change over to the auxiliary IC memory card is taken into consideration and the transition to S607 is made when estimated remaining time available for recording or available capacity falls below a predetermined value. By adopting this expedient, it is possible to prevent recording from being interrupted at the time of the changeover and an error message for when the auxiliary IC memory card is absent can be reported to the user slightly before recording actually can no longer be performed.

At S609, the final destination for copying, the source of copying and the range of addresses to which copying is performed are set (IC memory card 1 is the source of copying and IC memory card 2 the destination of copying in the example of FIG. 3). The apparatus then waits for a photography-end command at S606. When photography ends, copying between cards (which corresponds to step 4 in FIG. 3) is carried out based upon the copying-related management information dealt with at S609, and the data that has been copied (scene 4a in FIG. 3) is erased from the main IC memory card.

Thus, one scene (one shot) of a moving picture can be recorded on a single IC memory card to the greatest extent possible according to this embodiment as well.

It should be noted that in this embodiment, available capacity of an amount corresponding to scene 4a is reserved on IC memory card 2, as shown at step 3 in FIG. 3, and the data of scene 4b is recorded seamlessly from the next address of the reserved area. However, this does not impose a limitation upon the present invention. For example, it is permissible to adopt an arrangement in which the data of scene 4b is recorded starting from the leading address of IC memory card 2 and the data of scene 4a on the IC memory card 1 is copied to the vacant area of IC memory card 2 at the end of recording.

In case of random-access media such as an IC memory card, it is possible even for data that has been recorded at separated addresses to be read out continuously. In this case, after the data of scene 4a has been copied to IC memory card 2, the leading address of the recording area for scene 4a on IC memory card 2 is set as the leading address of scene 4. A pointer is set such that after the data at the final address of scene 4a has been played back, the address jumps to the leading address of scene 4b, i.e., to the leading address of IC memory card 2, to thereby play back the data. This makes it possible to play back the data of scene 4 correctly.

Modification

In both of the above embodiments, the data that has been recorded on the main IC memory card is eventually deleted if the available capacity of the main IC memory card runs out during recording and the auxiliary IC memory card is used. As a result, the main IC memory card is restored to a state identical with state A, namely the state prevailing prior to recording, as illustrated at C in FIGS. 2 and 3.

The available capacity may be used by recording control processing, which has been described in the first and second embodiments, in subsequent recording of a moving picture, or it is possible to utilize the available capacity for the purpose of recording still pictures. However, since an image signal is recorded on the main IC memory card again after an image signal has been recorded on the auxiliary IC memory card, the image signals will no longer be recorded on the two memory cards in the order in which they were captured.

Still, leaving available capacity unused is wasteful. Therefore, in a case where recording in the order of date of photography is given priority as by a setting made by the user, the available capacity is used as an auxiliary recording area in an instance where the scene photographed next exceeds the available capacity of the main IC memory card (the auxiliary IC memory card in the first and second embodiments). In a case where utilizing the IC memory card with as little waste as possible is given priority as by the user setting, the available capacity is used in recording based upon the normal recording mode to the extent that the available capacity allows. Thus, the available capacity can be used effectively.

By way of example, if the setting is such that priority is given to recording in the order of date of photography, recording starts from the IC memory card containing the scene recorded last, irrespective of which of the memory cards has the larger available capacity. Accordingly, if a scene 5 is photographed anew in a case where priority to recording in the order of date of photography has been set in a state such as state C in FIG. 2 or 3, then scene 5 will be recorded following scene 4 on IC memory card 2.

Figure 4:
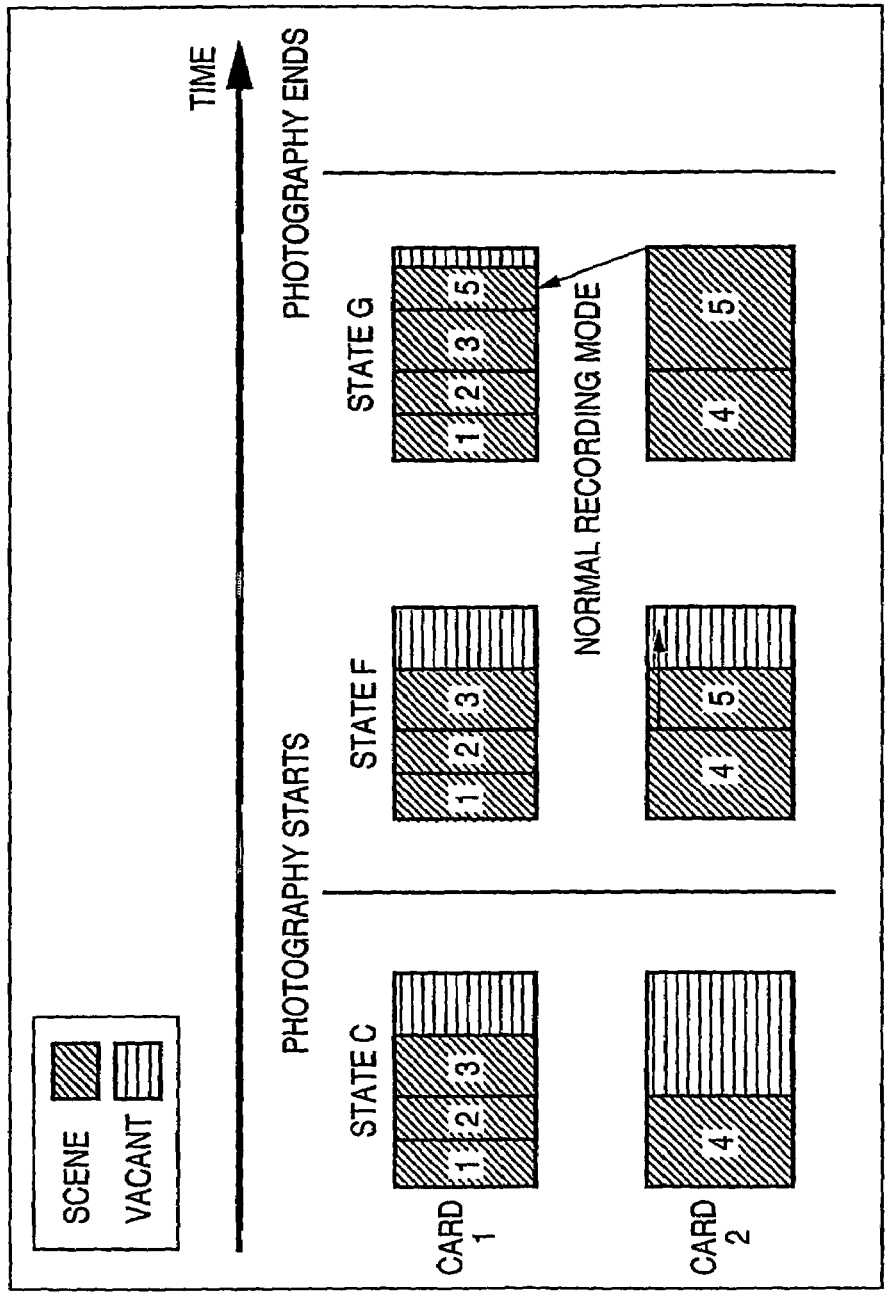
FIG. 4 is a diagram schematically illustrating recording control processing according to a modification of the first and second embodiments.

Recording control processing in which the vacant area of IC memory card 1 is used as auxiliary capacity will be described with reference to FIG. 4 for a case where recording is performed as mentioned above. When photography of scene 5 begins from state C, which is similar to state C in FIGS. 2 and 3, recording is started on IC memory card 2, which contains scene 4 recorded last (state F). If IC memory card 2 runs out of available capacity during the recording of scene 5, writing continues to the vacant area of IC memory card 1 while the user is alerted (state G). For example, it may be so arranged that after photography is completed in state G, the fragments of scene 5 are collected together and copied to the other IC memory card, thereby consolidating scene 5 on a single IC memory card.

Other Embodiments

The embodiments set forth above are premised on automatically selecting as an auxiliary IC memory card whichever of two IC memory cards has the greater available capacity and selecting as a main IC memory card whichever of the two IC memory cards has the smaller available capacity. However, it may also be so arranged that which of these IC memory cards is to be utilized as the main IC memory card can be set by the user employing the operating switch 105, by way of example.

In this case, it may be so arranged that data is deleted from the auxiliary IC memory card so as to maintain the available capacity of the main IC memory card, which has been selected by the user, even in a case where available capacity exists in the main IC memory card upon conclusion of recording in the simultaneous recording mode in the first embodiment.

It should be noted that the foregoing embodiments have been described for a case where two IC memory cards exist in order to facilitate an understanding of the present invention. However, the present invention is also applicable to a recording apparatus that is capable of utilizing three or more memory cards.

For example, at step S502 in the first embodiment, a main IC memory card to be used next in recording of a moving picture (IC memory card 1 in the example of FIG. 2) and an auxiliary IC memory card for supplementary recording (IC memory card 2 in the example of FIG. 2) are selected from among n-number of IC memory cards (where n is a natural number equal to or greater than 3). The conditions for selecting the main and auxiliary IC memory cards from among three or more IC memory cards can be set at will. If two IC memory cards are capable of being recorded on simultaneously, then, by way of example, the IC memory card having the largest available capacity may be selected as the auxiliary IC memory card, and the IC memory card having the next [or m-th (2=<m=<n)] largest available capacity or an IC memory card having the smallest available capacity that satisfies a predetermined reference available capacity (e.g., an average capacity needed to record a moving picture of a prescribed length) may be selected as the main IC memory card.

In the second embodiment also, main and auxiliary IC memory cards can be similarly selected. Further, in a case where the auxiliary IC memory card runs out of available capacity after the switch to this card has been made, another auxiliary IC memory card may be selected from among the remaining (n−2)-number of IC memory cards, thereby enabling recording to be performed in chain-like fashion.

Thus, even if three or more IC memory cards are used, the user can select the main and auxiliary IC memory cards.

Furthermore, the foregoing embodiments have been described solely with regard to a case where IC memory cards are used as the recording media. However, the present invention is also applicable to a recording apparatus that uses other recording media such as magnetic recording media and optical recording media. Further, as long as the information recorded requires to be recorded in successive fashion, the present invention is also applicable to any such information, inclusive of still pictures, and not solely to moving pictures.

Further, as long as a recording apparatus according to the present invention has a structure that makes it possible to record information on a plurality of recording media, other functions are not essential and functions for performing, e.g., image sensing (the lens unit 101, image sensing device 102, image signal processor 103 and imaging controller 104) need not be included in the recording apparatus of the present invention.

Though the foregoing embodiments have been described solely with regard to a recording apparatus consisting of a single device, equivalent functions may be implemented by a system composed of a plurality of devices.

It should be noted that the present invention also covers a case where software programs for implementing the functions of the above embodiments are supplied directly from a recording medium, or through use of wired/wireless communication, to a system or apparatus having a computer that is capable of executing the above-mentioned programs, and the system or apparatus executes the supplied programs to thereby implement the equivalent functions.

Accordingly, program code per se supplied to and installed in a computer in order that the computer may execute the processing of the present invention also implements the invention. In other words, the computer program that implements the processing of the present invention also is covered by the present invention.

In this case, so long as the system or apparatus has the functions of the program, the form of the program, e.g., object code, a program executed by an interpreter or script data supplied to an operating system, etc., does not matter.

Examples of recording media by which the program can be supplied are magnetic recording media such as floppy disk, hard disk and magnetic tape, optical/magneto-optical storage media such as a magneto-optical disk, CD-ROM, CD-R, CD-RW, DVD-ROM, DVD-R and DVD-RW, and a non-volatile semiconductor memory.

As for the method of supplying the program using wired/wireless communication, the computer program itself for forming the present invention in the server of a computer network, or a data file (program-data file) that can serve as a computer program for forming the present invention in a client computer, such as a compressed file having an automatic install function, can be stored and the program-data file can be downloaded to a connected client computer. In such case the program-data file can be divided into a plurality of segment files and the segment files can be deployed at different servers.

In other words, the present invention also covers a server apparatus that allows multiple users to download a program-data file for the purpose of implementing the functions of the present invention by computer.

Further, it is also possible to encrypt and store the program of the present invention on a storage medium such as a CD-ROM, distribute the storage medium to users, allow users who meet certain requirements to download decryption key information from, e.g., a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer can perform all or a part of the actual processing based upon commands in the program so that the functions of the foregoing embodiments are be implemented by this processing.

Furthermore, after the program read from a recording medium is written to a function expansion board inserted into the computer or to a memory provided in a function expansion unit connected to the computer, a CPU or the like mounted on the function expansion board or function expansion unit can perform all or a part of the actual processing based upon commands in the program so that the functions of the foregoing embodiments can be implemented by this processing.

Thus, in accordance with the present invention, as described above, it can be so arranged that a recording apparatus capable of recording information on a plurality of recording media can record one item of continuous information collectively on a single recording medium to the greatest extent possible.

As many apparently widely different embodiments of the present invention can be made without departing from the spirit and scope thereof, it is to be understood that the invention is not limited to the specific embodiments thereof except as defined in the appended claims.

The invention claimed is:

1. A recording apparatus comprising:
   input means for inputting moving image data;
   first interface means for recording and playing back the moving image data on and from a first recording medium;
   second interface means for recording and playing back the moving image data on and from a second recording medium;
   instruction means for providing a recording start instruction and a recording stop instruction of the moving image data; and
   control means for controlling said first interface means so as to start to record the moving image data on the first recording medium in accordance with the recording start instruction, determining whether an available capacity of the first recording medium is less than a predetermined capacity or not, and controlling said second interface means in accordance with a determination result,
   wherein said control means further controls said first and second interface means so as to:
      if a determination is made that the available capacity of the first recording medium is less than the predetermined capacity before the recording stop instruction is provided:
         start recording ensuing moving image data on the second recording medium;
         stop the recording on the second recording medium when the recording stop instruction is provided; and
         move, to the second recording medium, the moving image data recorded on the first recording medium between a time when the recording start instruction is provided and a time when the determination is made that the available capacity of the first recording medium is less than the predetermined capacity, and
      if the recording stop instruction is provided before the determination is made that the available capacity of the first recording medium is less than the predetermined capacity:
         prohibit the moving image data recorded on the first recording medium from being moved to the second recording medium.

2. The apparatus according to claim 1, wherein, if the first recording medium runs out of available capacity during recording of the moving image data to the first recording medium, said control means controls said first and second interface means so as to record ensuing moving image data to the second recording medium upon reserving an area that corresponds to an available capacity of the first recording medium at a start of recording of the moving image data on the second recording medium, halt recording of the moving image data in response to the recording stop instruction, and move the moving image data that has been recorded on the first recording medium to the area that has been reserved on the second recording medium.

3. An apparatus according to claim 2, wherein said control means further controls said second interface means so as to record the moving image data moved from the first recording medium to the reserved area and ensuing moving image data that has already been recorded on the second recording medium as a single data file altogether.

4. An apparatus according to claim 1, wherein said control means further controls said first interface means to delete from the first recording medium the moving image data that has been moved to the second recording medium.

* * * * *